United States Patent [19]

Ishikawa

[11] Patent Number: 5,113,501
[45] Date of Patent: May 12, 1992

[54] SYSTEM FOR CHECKING THE ACTIVITY AND ACTIVITY RATIO OF MICROPROGRAM UNDER TEST

[75] Inventor: Tadashi Ishikawa, Tokyo, Japan

[73] Assignee: Kabushiki Kaisha Toshiba, Kawasaki, Japan

[21] Appl. No.: 353,196

[22] Filed: May 16, 1989

Related U.S. Application Data

[63] Continuation of Ser. No. 41,332, Apr. 22, 1987, abandoned.

[30] Foreign Application Priority Data

Apr. 30, 1986 [JP] Japan ................. 61-100747

[51] Int. Cl.⁵ .............. G06F 9/22; G06F 11/00
[52] U.S. Cl. ................. 395/375; 364/262.8; 364/263.3; 364/264; 364/265.6; 364/943.91; 364/944.6; 364/DIG. 1; 371/19
[58] Field of Search ... 364/200 MS File, 900 MS File; 371/19

[56] References Cited

U.S. PATENT DOCUMENTS

| | | | |
|---|---|---|---|
| 4,211,916 | 7/1980 | Baxansky et al. | 364/200 |
| 4,275,441 | 6/1981 | Takeuchi | 364/200 |
| 4,315,313 | 2/1982 | Armstrong et al. | 364/200 |
| 4,429,368 | 1/1984 | Kurii | 364/580 |

Primary Examiner—Thomas C. Lee
Assistant Examiner—Ayni Mohamed
Attorney, Agent, or Firm—Finnegan, Henderson, Farabow, Garrett and Dunner

[57] ABSTRACT

An apparatus capable of checking the validity of a microprogram, includes an initializing unit for initializing data representing the validity of each microinstruction of a microprogram to be tested (the validity indicating that each microinstruction is executed), an updating unit for updating the validity data associated with a microinstruction executed when the to-be-tested microprogram is executed, and a reading unit for reading out the validity data when execution of the to-be-tested microprogram is completed.

12 Claims, 3 Drawing Sheets

SYSTEM FOR CHECKING THE ACTIVITY AND ACTIVITY RATIO OF MICROPROGRAM UNDER TEST

This application is a continuation of application Ser. No. 07/041,332, filed Apr. 22, 1987, now abandoned.

BACKGROUND OF THE INVENTION

This invention relates to a microprogram activity-checking circuit, which is suitable for verifying the validity of test data based on the activity ratio of a microprogram, calculated upon testing of the microprogram.

A microprogram-controlled type data-processing device executes a user command based on a combination of microinstructions or a microprogram. When a user command having complex functions or a complex microprogram is tested, checking the activity and activity ratio of the microprogram under test is a significantly effective method of verifying the validity of test data used for the testing of the microprogram.

When one step of a microprogram is executed, the step is considered to have become active. An activity ratio is the ratio of the number of active steps to the number of the total steps of a microprogram under test. Test data, by nature, should have a 100% activity ratio. Test data with a 100% activity ratio should be easy to prepare when a microprogram to be tested consists of a small number of steps and its logic is simple; however, preparation of such test data is difficult when the microprogram is complex and/or lengthy. It is also difficult to verify the validity of test data which is used to check a complex and lengthy microprogram. Therefore, there is a demand for a microprogram activity-checking circuit which is capable of verifying the validity of such test data easily and reliably.

SUMMARY OF THE INVENTION

With the above situation in mind, it is an object of this invention to provide a microprogram activity-checking circuit, which can easily determine the activity and the activity ratio of a microprogram, irrespective of its complexity and volume, and which can therefore easily and reliably verify the validity of test data.

To achieve this object,
a microprogram checking apparatus for checking the activation status of a plurality of microinstructions of a micro program executed by an input microprogram, comprising:
storage means having addresses for storing activation data;
circuit means including means for setting the content of each of the addresses of said storage means to the common state in response to the input microprogram execution command prior to the execution of the microprogram, means for writing the activation data at said address for each of the microinstructions at times when said each of the microinstructions is executed, and means for reading out the activation data from the addresses of said storage means after at least the execution of the microprogram.

The above object is also achieved by a microprogram activity-checking circuit for checking the activity frequency of a microprogram, which comprises:
storage means for storing activity frequency data for the microprogram,
initializing means for writing initializing data into the storage means,
updating means for addressing the storage means, using address data for read-accessing the microprogram memory, for reading out the activity frequency data from an addressed location of the storage means, and for writing the activity frequency data updated by incrementing by one in the addressed location of the storage means, and
reading means for reading out the activity frequency data from the storage means.

As has been explained above, according to this invention, when a microprogram is tested, the activity and activity ratio of the microprogram can be easily determined, irrespective of the size of the microprogram, so that the validity of test data can be easily and reliably verified.

DETAILED DESCRIPTION OF THE PREFERRED EMBODIMENTS

A microprogram activity-checking circuit of this invention will now be explained, in conjunction with the accompanying drawings.

Figure 1:
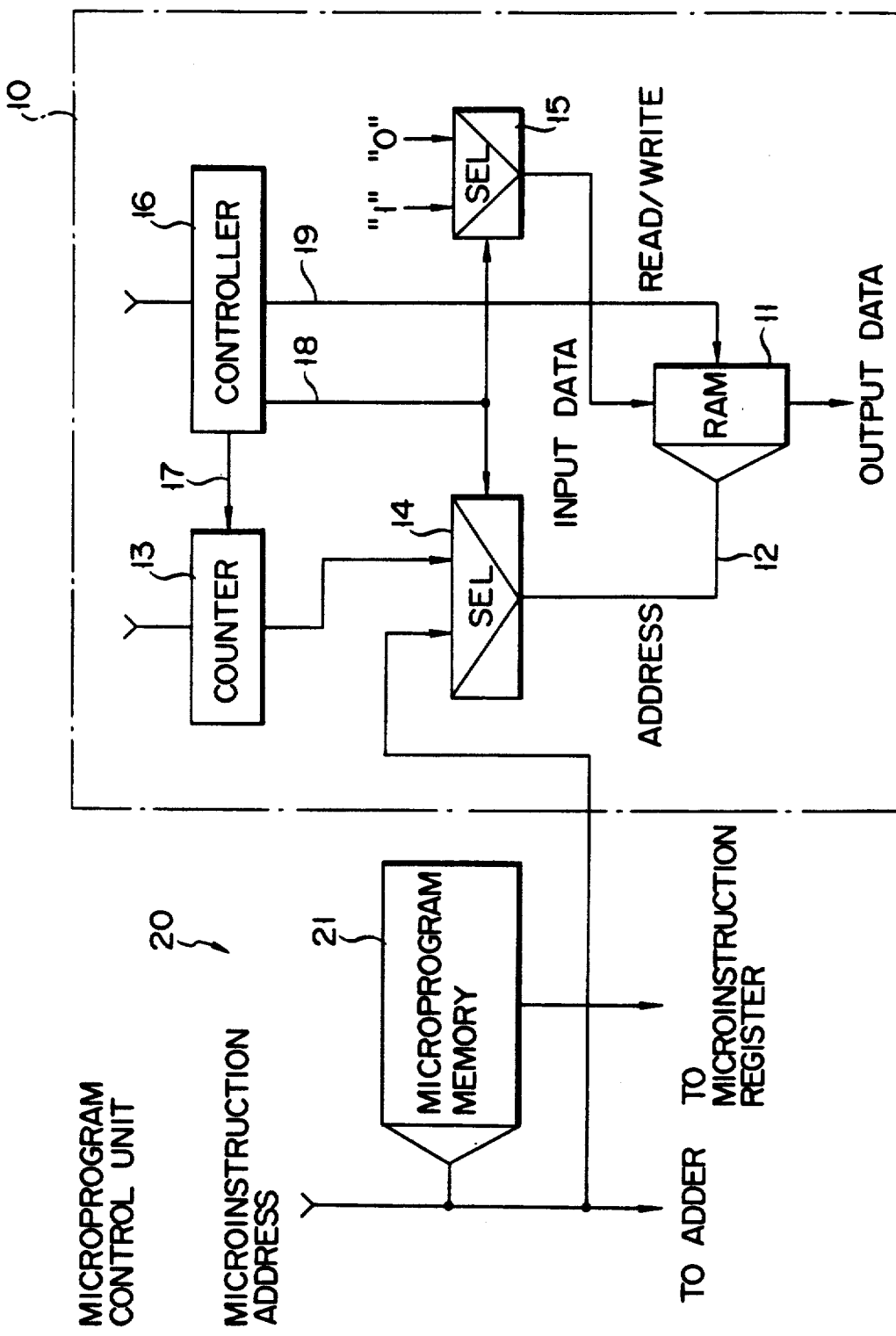
FIG. 1 is a block diagram of a microprogram activity-checking circuit according to the first embodiment of this invention.

To begin with, the first embodiment of this invention will be explained. FIG. 1 is a block diagram showing a microprogram activity-checking circuit 10 according to the first embodiment. This microprogram activity-checking circuit 10 is attached to a microprogram control unit 20, which is typically used in a microprogram-controlled type data-processing device. Microprogram control unit 20 has a microprogram memory 21 with an n-word capacity, which stores various microprograms and is addressed by a microinstruction address. A microinstruction read out from memory 21 is latched in a microinstruction register (not shown), and is used to control various arithmetic and logic units (not shown) and microprogram activity-checking circuit 10.

Microprogram activity-checking circuit 10 includes controller 16 which provides various control signals according to a specific microprogram in memory 21. Microprogram activity-checking circuit 10 also includes storage means for storing activity data for the microprogram. As embodied herein, said storage means includes a random access memory or RAM 11. RAM 11 stores data representing the activity of each step of a microprogram stored in memory 21. RAM 11 has a memory capacity of 1 bits × n words, and can therefore store the same number of words as memory 21. RAM 11 has two data ports, i.e., an input port and an output port, and is controlled by a mode control signal 19 which specifies either a read mode or a write mode. RAM 11, when in the write mode, stores activity data coming into the input port, in an addressed location; in the read mode, it outputs activity data from an addressed location via the output port. Microprogram activity-checking circuit 10 also includes initializing means for writing initializing data into the storage means. As embodied herein, said initializing means includes a counter 13, and selectors 14 and 15.

Counter 13 provides address data to RAM 11, in the initialization mode and in the read mode. Counter 13 is supplied with control data 17 from controller 16, in order to preset its count value, and is supplied with a count control signal from an external unit, so as to perform a counting-up operation. Microprogram activity-checking circuit 10 also includes writing or updating means for writing the activity or activity frequency data at the addressed location of the storage means. As embodied herein, said writing or updating means include selectors 14 and 15 for addressing the storage means, using address data for read-accessing the microprogram memory, and for writing the activity or activity frequency data at the addressed location of the storage means, in parallel with the execution of the microinstruction. Microprogram activity-checking circuit 10 also includes reading means for reading out the activity data from the storage means. As embodied herein, said reading means includes counter 13 and selector 14.

Selector (SEL) 14 is supplied with an output or address data from counter 13, as well as microinstruction address data. Selector 14 receives selection control signal 18 from controller 16 and, in accordance with this signal, selectively outputs either the output of counter 13 or the microinstruction address data to RAM 11, as address data via an address line 12. Logic "0" and logic "1" data is supplied to selector (SEL) 15. Selector (SEL) 15 also receives selection control signal 18 from controller 16 and, in accordance with this signal, selectively outputs, to the input port of RAM 11, data of logic "1" when in the write mode, or data of logic "0" when in the initialization mode.

Figure 2:
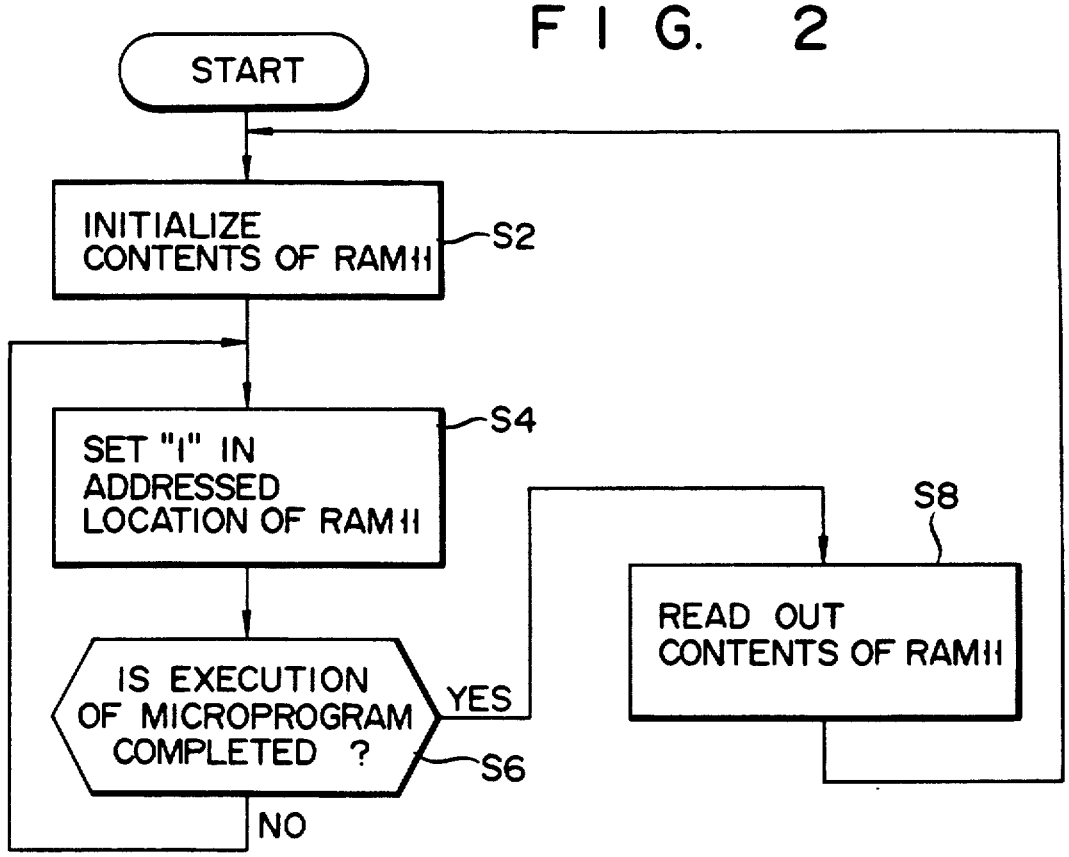
FIG. 2 is a flowchart used to explain the operation of the first embodiment.

The operation of the first embodiment will be explained below, with reference to the flowchart shown in FIG. 2.

In step S2, RAM 11 is initialized prior to determination of the activity of a microprogram stored in memory 21. This initialization is carried out as follows:

First, a microprogram for controlling microprogram activity-checking circuit 10 is read out from memory 21, and is supplied to controller 16, as a activity check command. In response to the check command, controller 16 outputs control data 17 to counter 13, and presets the content of counter 13 to an initial value "0".

In response to the received check command, controller 16 outputs mode control signal 19 to RAM 11, to set the RAM in the write mode, and outputs first selection control signal 18 to selectors 14 and 15, such that selector 14 transfers the output of counter 13 onto address line 12 to RAM 11, while selector 15 transfers the logic data "0," as write-in data, to the input port of RAM 11.

After the first input data "0" is written in RAM 11, the content of counter 13 is incremented by "1", in response to the counter control signal. That is, the content of counter 13 is updated to address 1 from address 0. Then, through the same process as described above, input data "0" is written at address "1" of RAM 11. The aforementioned operational sequence is repeated until input data "0" is written at address "n−1" of RAM 11. As a result, RAM 11 is cleared with zeros.

When RAM 11 is cleared, controller 16 sends second selection control signal 18 to selectors 14 and 15, so that selector 14 selects the microinstruction address data and selector 15 selects logic "1" data as an input data to RAM 11. Since no mode control signal 19 is sent this time to RAM 11, the RAM remains set in the write mode.

Upon completion of initializing RAM 11, the microprogram to undergo testing is executed, and steps S4 and S6 are then executed to determine the activity of the microprogram. In step S4, logic data "1" from selector 15 is written at the address in RAM 11, which coincides with the address in memory 21 which is referred to in accordance with a microinstruction address. Step S6 determines whether or not the execution of the to-be-tested microprogram is completed; if YES, the process flow advances to step S8, and if NO, the flow returns to step S4.

The activity of the microprogram is determined by repeatedly executing steps S4 and S6. That is, if all the steps or the microinstructions of the to-be-tested microprogram in memory 21 are accessed to read out, logic data "1" should be written at all the addresses in RAM 11.

When it is determined, in step S6, that the execution of the microprogram is completed, this fact is relayed to controller 16 so that step S8 will be executed as follows:

Controller 16 sends mode control signal 19 to RAM 11, so as to set RAM 11 in the read mode, and sends third selection control signal 18 to selector 14, to select the address data from counter 13. Controller 16 also sends control data 17 to counter 13, to reset it to the initial value. Then, readout of data representing the activity of the microprogram from RAM 11 begins. The content of counter 13 is incremented by "1", in response to the counter control signal, as in the initialization mode. Accordingly, the activity data is sequentially read out from all the address of RAM 11. In this manner, the contents of that region in RAM 11 which corresponds to the region in memory 21 are sequentially read out from the output port of RAM 11. In other words, the 1-bit activity data is read out from RAM 11 for each step of the microprogram.

In this embodiment, the output port of RAM 11 is coupled to a data output bus to an arithmetic and logic unit (not shown). The data from RAM 11 can be used to check the activity of the to-be-tested microprogram by transferring the data to a register, a memory or the like which is coupled to the data bus. This activity checking ensures the following checks are carried out, and therefore improves the quality of a designed microprogram.

1) Checking of the validity of test data (or checking of any test item left out of the checking operation).
2) Detection of unnecessary instructions or those which will never be executed.
3) Detection of erroneous non-execution of microinstructions, which is not apparent from the test results; i.e., detection of the state in which a microinstruction which is designed to be executed has not actually been executed, but which has not been detected as an error in the test.

Figure 4:
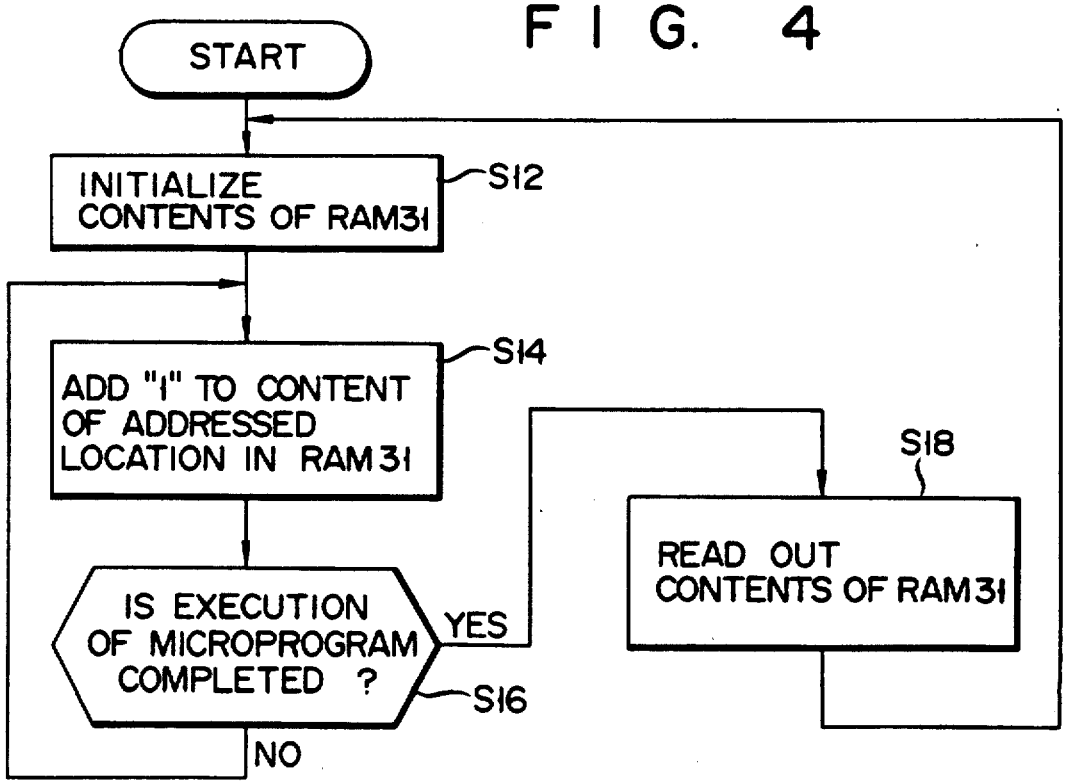
FIG. 4 is a flowchart used to explain the operation of the second embodiment.
Figure 3:
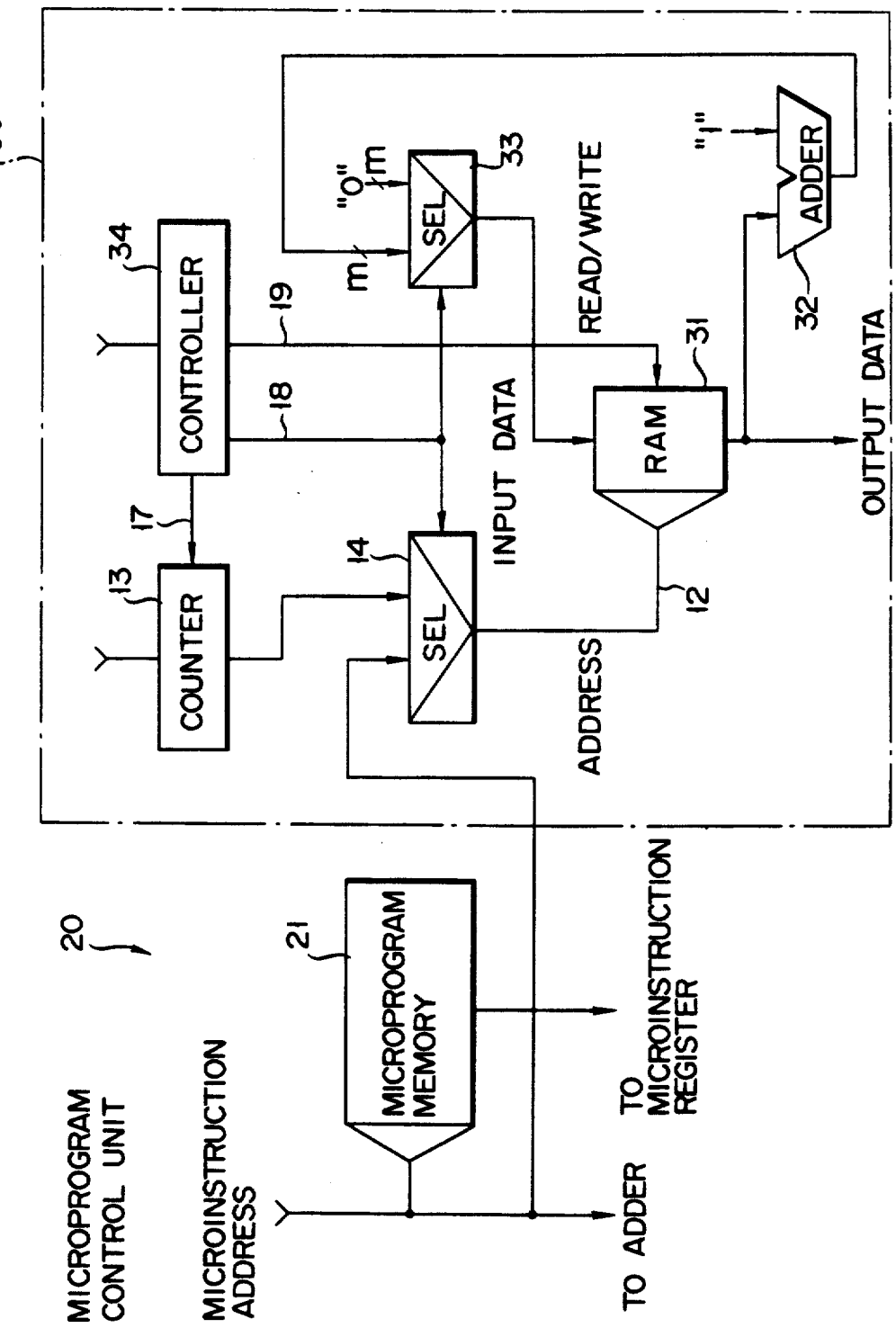
FIG. 3 is a block diagram of a microprogram activity-checking circuit according to the second embodiment of this invention.

The following is an explanation, with reference to FIGS. 3 and 4, of a microprogram activity-checking circuit according to the second embodiment, which is capable of determining the activity ratio of a microprogram or the frequency with which the activity occurs in the microprogram.

FIG. 3 shows a block diagram of a microprogram activity-checking circuit 30 of the second embodiment. For the sake of easier understanding of this invention, this diagram uses the same reference numerals as used in FIG. 1, for equivalent circuit elements, thus omitting redundant explanations thereof.

Circuit 30 of FIG. 3 differs from circuit 10 of FIG. 1 in the following aspects:

The 1-bit-by-n-word, two-port RAM 11 of FIG. 1 is replaced with an m-bit-by-n-word, two-port RAM 31 for storing data about the number of activities of the steps contained in a microprogram;

an output port of this RAM 31 is coupled to an adder 32 which is additionally provided to increment the activity frequency data by one.

Adder 32 has one input terminal coupled to the output port of RAM 31, in order to receive data therefrom, and has the other input terminal supplied with a value "1". Selector 15 of FIG. 1 is replaced by selector 33, which selectively outputs the m-bit output data of adder 32 and all-zero m-bit data to the input port of RAM 31, as write-in data. In place of controller 16 of FIG. 1, a controller 34 is used in the circuit of FIG. 3, for controlling counter 13, selectors 14 and 33, and RAM 31.

The operation of activity-checking circuit 30 will now be explained with reference to FIG. 4.

Step 12 is similar to the aforementioned step 2, but differs therefrom in that all-zero m-bit data is selected as the write-in data by selector 33, in order to initialize the m-bit-by-n-word RAM 31.

When the initialization of RAM 31 is completed, in step S12, steps S14 and S16 are executed so as determine the activity frequency. First, in step S14, controller 34 sends second selection control signal 18 to selector 14 and 33, such that selector 14 selects microinstruction address data and such that selector 33 outputs the activity frequency data from adder 32 to the input port of RAM 31, and sends mode control signal 19 to RAM 31, for setting the RAM to the read mode. Consequently, data representing the activity frequency is read out from that address of RAM 31 which is associated with a microinstruction to be executed in memory 21.

The read-out data is transferred to adder 32, which increments the data by "1" and sends it to selector 33. At this time, controller 34 sends mode control signal 19 to RAM 31, to change the mode of the RAM to the write mode, and selector 14 continues outputting the microinstruction address data of the microinstruction which is being executed. Therefore, the updated activity frequency data from selector 33 is written into RAM 31. Here, the memory cycle of RAM 31 is the same as that of microprogram memory 21, and the reading of data from RAM 31 is executed for each memory cycle, while data writing is executed when the memory cycle changes. In this manner, every time each microinstruction in memory 21 is executed, the associated activity frequency data is updated.

Step S16 determines whether or not the execution of the microprogram is completed. If YES, step S18 is then performed, and if NO, step S14 is executed again. As step S14 is repeated, the activity frequency data in RAM 31 is updated.

When the decision in step S16 is affirmative, the readout of the activity frequency data begins, which causes controller 34 to send control signals 18 and 19 to selector 14 and RAM 31. To be specific, third selection control signal 18 is sent to selector 14, in order to selectively pass the output of counter 13 to RAM 31, and mode control signal 19 is sent to RAM 31, so as to set the RAM in the read mode. Control data 17 is sent to counter 13 from controller 34, in order to set the content to a predetermined value, for example, initial value "0". The addressing of RAM 31 for readout of the activity frequency data is the same as the addressing performed in the initialization mode.

With the aforementioned operation, the number of times the microinstructions of a microprogram are executed can be counted, for example, upon running an application program. It is also possible to detect which microprogram routine requires adjusting in order to improve the processing ability of a CPU. Therefore, the quality of a designed microprogram can be improved as compared with the case in which activity-checking circuit 10 is used.

What is claimed is:

1. A microprogram checking apparatus for checking whether or not each one of a plurality of microinstructions of a microprogram has been activated when the microprogram is executed by an input microprogram execution command provided by an external circuit, each microinstruction of the microprogram being stored at a respective address of a microprogram memory coupled to said microprogram checking apparatus, comprising:

storage means having addresses for storing activation data which each represents whether or not each respective microinstruction of the microprogram has been activated during the execution of the microprogram;

means for setting the content of each one of the addresses of said storage means to a common state in response to the input microprogram execution command provided from the external circuit before the execution of the microprogram commences;

generating means for sequentially generating a plurality of addresses at times when the content of each of the addresses of said storage means is set to the common state and other times when the activation data is read out after the execution of the microprogram is completed;

first selecting means for selectively outputting one of the sequentially generated addresses at times when the content of each of the addresses of said storage means is set to the common state and other times when the activation data is read out after the execution of the microprogram is completed, and the addresses of the microprogram memory at times when the microprogram is executed to said storage means;

second selecting means for selectively outputting a first value at times when the content of each of the addresses of said storage means is set to the common state and other times when the activation data is read out after the execution of the microprogram is completed, and a second value at time when one of the plurality of microinstructions is activated, the first value being different from the second value;

means for writing a predetermined logic value representing that the microinstruction has been activated at a respective one of said addresses of said storage means for each respective microinstruction when said each respective microinstruction is activated during the execution of the microprogram, said respective one of said addresses of said storage means corresponding to said address of the microprogram memory where said each respective microinstruction is stored, said predetermined logic value being different from the common state; and means for reading out stored activation data from said storage means after the execution of the microprogram is completed.

2. The apparatus according to claim 1, wherein the number of the addresses of said storage means is equal to the number of the addresses of the microprogram memory.

3. The apparatus according to claim 1, wherein said storage means is a random access memory.

4. The apparatus according to claim 1, wherein each address of said storage means holds at least one bit of memory.

5. A microprogram checking apparatus for checking whether or not each one of a plurality of microinstructions of a microprogram has been activated when the microprogram is executed by an input microprogram execution command provided by an external circuit, each microinstruction of the microprogram being stored at a respective address of a microprogram memory coupled to said microprogram checking apparatus, comprising:
storage means having addresses for storing activation data representing whether or not each respective microinstruction of the microprogram has been activated during the execution of the microprogram;
means for setting the content of each one of the addresses of said storage means to a common state in response to the input microprogram execution command provided from the external circuit before the execution of the microprogram commences;
means responsive to an output of said storage means for adding a positive integer value to the activation data read out from said storage means at one of the addresses thereof corresponding to one of the plurality of microinstructions after said one of the plurality of microinstructions is executed, to update the corresponding activation data;
means for writing a predetermined logic value representing that the microinstruction has been activated at a respective one of said addresses of said storage means for each respective microinstruction when said each respective microinstruction is activated during the execution of the microprogram, said respective one of said addresses of said storage means corresponding to said address of the microprogram memory where said each respective microinstruction is stored, said predetermined logic value being different from the common state; and
means for reading out stored activation data from said storage means after the execution of the microprogram is completed.

6. An apparatus according to claim 5, wherein said positive integer value is 1.

7. A method of checking whether or not each one of a plurality of microinstructions of a microprogram has been activated when the microprogram is executed by an input microprogram execution command provided by an external circuit, each microinstruction being stored at a respective address of a microprogram memory, comprising the steps of:
setting the content of addresses of a storage means for storing activation data representing whether or not each respective microinstruction has been activated to a common state before the expiration of the microprogram commences, said setting step including;
setting a counter connected to the storage means to an initial value "0";
setting the content of each of the addresses of the storage means at an address corresponding to the set value in said counter to a logic value "0"; and
incrementing the set value in the counter by a positive integer and setting the content of the storage means at the corresponding address to the logic value "0" until the entire content of the storage means is set to the logic value "0";
writing a predetermined logic value representing that the microinstruction has been activated at a respective one of said addresses of said storage means for each respective microinstruction when said each microinstruction is activated during the execution of the microprogram, said respective one of said addresses of said storage means corresponding to said address of the microprogram memory where said each respective microinstruction is stored, said predetermined logic value being different from the common state; and
reading out stored activation data from said storage means after the execution of the microprogram is completed.

8. The method according to claim 7, wherein the logic value writing step includes:
setting said storage means in a write mode; and
adding a positive integer value "1" to the activation data read out from the storage means at one of the addresses thereof corresponding to one of the plurality of microinstructions after when said one of the plurality of microinstructions is activated and setting the content of said one of the addresses of the storage means to the added value, for updating the corresponding activation data.

9. The method according to claim 7, wherein the step of reading out the activation data from the storage means includes the substeps of:
setting a counter connected to the storage means to an initial value "0";
outputting the content of said storage means at an address corresponding to the set value in said counter; and
incrementing the set value in said counter by a positive integer and outputting the content of said storage means at an address corresponding to the set value until the entire content of said storage means is output.

10. A method of checking whether or not each one of a plurality of microinstructions of a microprogram has been activated when the microprogram is executed by an input microprogram execution command provided by an external circuit, each microinstruction being stored at a respective address of a microprogram memory, comprising the steps of:
setting the content of addresses of a storage means for storing activation data representing whether or not each respective microinstruction has been activated to a common state before the expiration of the microprogram commences;
writing a predetermined logic value representing that the microinstruction has been activated at a respective one of said addresses of said storage means for each respective microinstruction when said each microinstruction is activated during the execution of the microprogram, said respective one of said addresses of said storage means corresponding to said address of the microprogram memory where said each respective microinstruction is stored, said predetermined logic value being different from the common state; and reading out stored activation data from said storage means after the execution of the microprogram is completed, including:

setting a counter connected to the storage means to an initial value "0";

outputting the content of said storage means at an address corresponding to the set value in said counter; and incrementing the set value in said counter by a positive integer and outputting the content of said storage means at an address corresponding to the set value until the entire content of said storage means is output.

11. The method according to claim 10, wherein the logic value writing step includes:

setting said storage means in a write mode; and adding a positive integer value "1" to the activation data read out from the storage means at one of the addresses thereof corresponding to one of the plurality of microinstructions after said one of the plurality of microinstructions is activated and setting the content of said one of the addresses of the storage means to the added value, for updating the corresponding activation data.

12. The method according to claim 10, wherein the step of reading out the activation data from the storage means includes the substeps of:

setting a counter connected to the storage means to an initial value "0";

outputting the content of said storage means at an address corresponding to the set value in said counter; and incrementing the set value in said counter by a positive integer and outputting the content of said storage means at a address corresponding to the set value until the entire content of said storage means is output.

* * * * *